June 4, 1929.  C. H. CURRIE  1,715,537
FILTER PIPE FOR SEWAGE TREATMENT TANKS
Filed Feb. 19, 1926
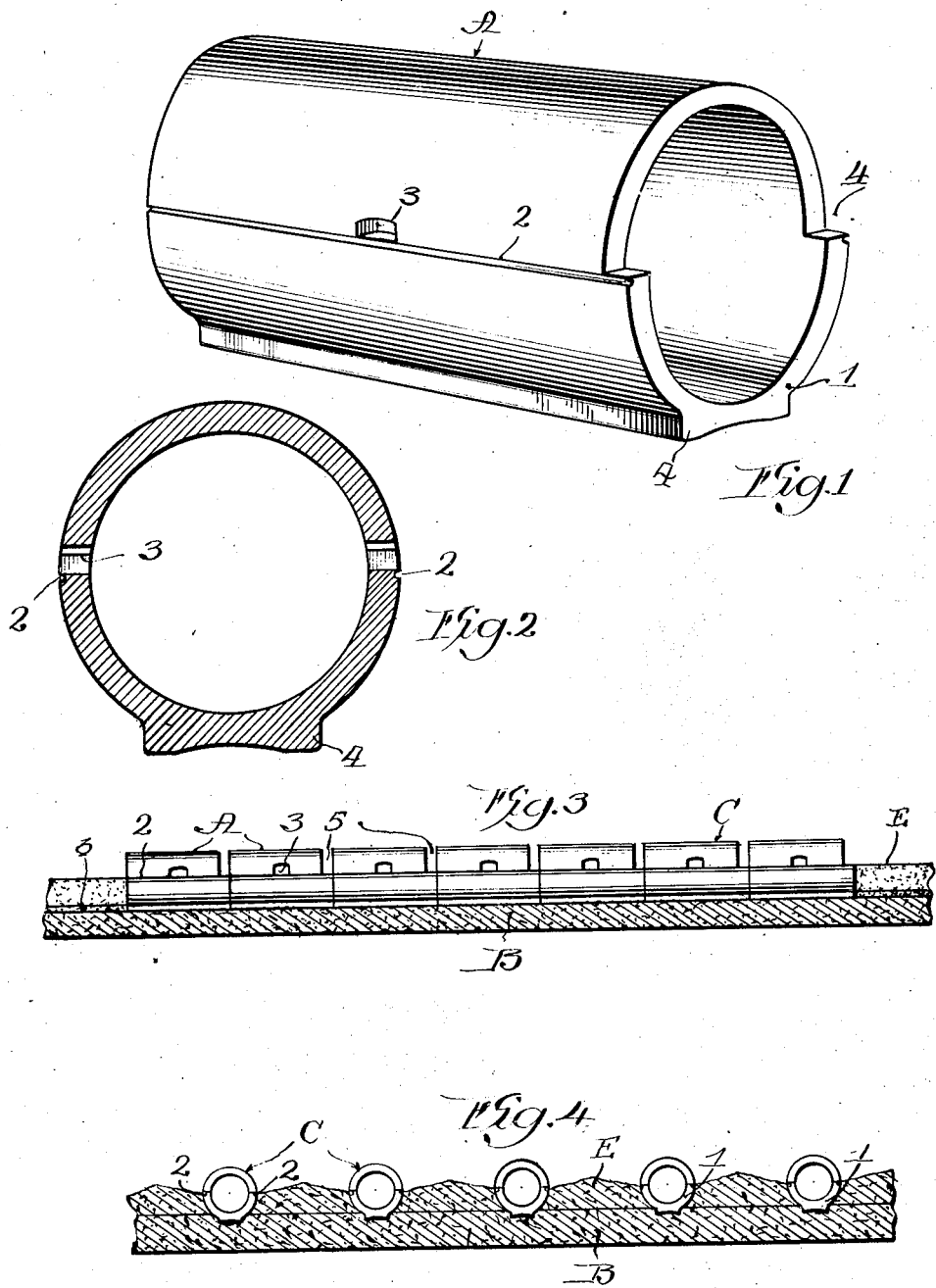

Patented June 4, 1929.

1,715,537

UNITED STATES PATENT OFFICE.

CLARE H. CURRIE, OF WEBSTER CITY, IOWA, ASSIGNOR TO PLYMOUTH CLAY PRODUCTS CO., OF FORT DODGE, IOWA, A CORPORATION OF IOWA.

FILTER PIPE FOR SEWAGE-TREATMENT TANKS.

Application filed February 19, 1926. Serial No. 89,450.

This invention relates to improvements in filter pipes for disposal tanks, and more particularly to a sectional pipe or duct designed to be laid in the floor of sewage disposal tanks and other forms of filtration apparatus, for the purpose of removing the filtered liquid from the tank.

Sewage disposal tanks or filtration apparatus are ordinarily constructed in the form of large concrete receptacles, rectangular in shape and containing layers of filtering material, such as gravel, cinders or sand, arranged in layers, the liquid being filtered as it passes downwardly to the bottom of the tank. At the bottom are arranged a series of parallel ducts or conduits through which the filtered liquid is removed. The present invention, therefore, pertains to a new and novel form of pipe or sectional drain tile especially constructed for this class of work.

A preferred embodiment of the invention is disclosed in the accompanying drawings, in which Figure 1 is a perspective view of a single pipe section.

Figure 2 is a cross-sectional view of the pipe section taken midway between its ends.

Figure 3 is a view in side elevation showing a series of pipe sections laid end to end in concrete to form a duct; and Figure 4 is a cross-sectional view of the floor of the disposal tank showing the arrangement of the several ducts consisting of the pipe sections embodying the invention.

As clearly shown in Figure 1, a single pipe section A is cylindric in shape, and preferably made of a ceramic material, such as clay, in vitrified form. These pipe sections may be made of any diameter, although for ordinary purposes are from six to ten inches in diameter and eighteen inches in length. At one end of each of the pipe sections A, a portion extending throughout one-half its circumference is removed, thereby leaving a spacing lug 1 of perhaps seven-eighths of one inch in width throughout the remaining half.

Extending throughout the length of each pipe section and on its outer surface, are two score lines 2—2 dividing the pipe section into an upper and lower half, the former including the portion removed, and the latter, the semi-circular spacing lug 1. Intermediate the ends of each pipe section and on opposite sides thereof, are two openings 3—3 relatively small in size and substantially rectangular in shape, of say two and one-half inches in length and one and one-half inches in height, with their upper ends being slightly arched. These openings are so located that their lower edges coincide with the score lines 2—2.

Extending the length of each pipe section and along its underside as determined by the score lines 2—2, is a base or foot 4 having a width substantially one-half the diameter of the section and projecting downwardly a distance just sufficient to provide a firm footing for the section. The sides of the base are straight and the bottom slightly concave transversely so that the thickness of the material at the center of the base is no greater than the normal thickness of the section.

As clearly shown in Figure 3, the pipe sections A are laid end to end on the concrete floor B of the tank, to form a single duct or conduit C, of which there may be several, arranged in parallel and spaced relation, as shown in Figure 4.

The surface of the concrete floor of the tank is prepared to receive the pipe sections, by the formation of shallow grooves $b$ arranged in parallel rows, these grooves being of a width and depth to receive the base 4 of each section. In this way, the sections are laid in perfect alignment both longitudinally and axially.

In placing the pipe sections along the parallel rows of grooves, each abuts against the adjacent section with the spacing lug 1 in contact with a square end, and so on, so that at each joint an upwardly opening semi-circular slot 5 is formed, these slots providing a series of intake openings equidistantly spaced through each duct.

The pipe sections having thus been laid on the grooved foundation layer of concrete B, additional concrete E is filled in between the ducts and up to the level of the score lines 2, 2 which marks the lower level of the smaller side openings 3 and the ends of the slots 5, thus partially embedding the ducts in the floor of the tank. In finishing the top layer of concrete, the surface is crowned slightly, so that the drainage will be divided more or less equally and laterally toward adjacent ducts, thus promoting a more uniform filtering action.

The floor of the tank having thus been completed, the filter bed is finally filled in, this being usually layers of coarse gravel, cinders or sand, whichever the conditions of use require. As a practical matter, a coarse material would be filled in first, and of a texture which would not pass readily through the openings in the filter tile or pipe sections, the finer material being nearer the top of the filter bed.

There are certain structural as well as practical features in the pipe construction herein disclosed, which are advantageous. In the first place, the cylindric shape affords maximum strength to resist the weight of the material above, since the portions thus exposed to the crushing effect are in reality semi-circular arches, and therefore of a shape capable of sustaining great load.

A further advantage from a practical standpoint is the ease and thoroughness with which the ducts can be cleaned, since a circular brush or swab can be inserted from one end and manipulated in much the same manner as a rifle barrel is cleaned.

And finally, the cost of manufacture is relatively low, since they can be made by practically the same methods as are used in the manufacture of ordinary drain tile or sewer pipe.

Having disclosed the preferred embodiment of my invention and its method of use, I claim:

1. A filter floor for disposal tanks and the like, comprising a layer of cementitious material having a series of parallel shallow channels in the surface thereof, rows of cylindric hollow conduits laid along said channels and having base portions adapted to fit within said channels and openings spaced at intervals along the sides thereof, and layers of relatively stable material between said rows of conduits embedding substantially the lower half thereof, the upper surface of said intermediate layers sloping in opposite directions toward the adjacent rows of conduits and meeting the same below the openings therein.

2. A filter floor for disposal tanks and the like, comprising a layer of cementitious material having a series of parallel shallow channels in the surface thereof, cylindric hollow pipe sections laid in rows end to end and having longitudinal base portions seating within said channels, and lateral openings located substantially midway their height, and a layer of cementitious material laid between adjacent rows of pipe sections and having its top surface inclined laterally in opposite directions and meeting said pipe sections along the line of the lower edges of said lateral openings.

3. A filter floor for disposal tanks and the like, comprising a cement floor having parallel shallow channels in the surface thereof, conduits supported on said floor and consisting of cylindric tile sections laid in rows end to end and having longitudinally extending base portions adapted to fit within said channels, each of said sections having diametrically opposed lateral openings between their ends, and a semi-circular slot at one end opening throughout the upper half thereof, and intermediate layers of concrete laid between said conduits to a depth substantially less than the height thereof and having their upper surfaces sloping in opposite directions toward said conduits and meeting the same along the line of the lower edges of said lateral openings and slots.

Signed at Alhambra, Calif., this 12th day of February, 1926.

CLARE H. CURRIE.